Dec. 17, 1929.  C. W. STEEN  1,740,046

POWER TRANSMITTING MECHANISM

Filed April 16, 1920

Inventor
C. W. Steen
By
Attorney

Patented Dec. 17, 1929

1,740,046

UNITED STATES PATENT OFFICE

CHARLES W. STEEN, OF NORWOOD, OHIO, ASSIGNOR TO ALLIS-CHALMERS MANUFACTURING COMPANY, OF MILWAUKEE, WISCONSIN, A CORPORATION OF DELAWARE

POWER-TRANSMITTING MECHANISM

Application filed April 16, 1920. Serial No. 375,112.

This invention relates to power transmitting mechanisms having bearings and may be applied in connection with electric motors or other prime movers. The invention is particularly applicable in cases where several machines are to be driven from a single shaft operated by a motor, one instance being in connection with cotton mill motors for driving spinning frames.

It has been found that where a plurality of machines are driven through power transmitting means associated with a single shaft, unless the shaft is made unduly large, there will be considerable wear on certain of the bearings. This occurs, for example, where an electric motor is provided with a comparatively long extension shaft to accommodate a plurality of belt pulleys, the end of the shaft being supported by a bearing. In such cases the motor bearing between the two end bearings will be subjected to excessive wear by reason of the tendency of the shaft to bend in the direction of the belt pull at that bearing. One of the objects of the present invention is to provide a mechanism and arrangement of parts whereby this difficulty will be obviated. Other objects will appear hereinafter as the description of the invention proceeds.

The novel features of this invention will appear from this specification and the accompanying drawing which forms a part thereof and discloses one embodiment of said invention and all these novel features are intended to be pointed out in the claims.

Figure 1:
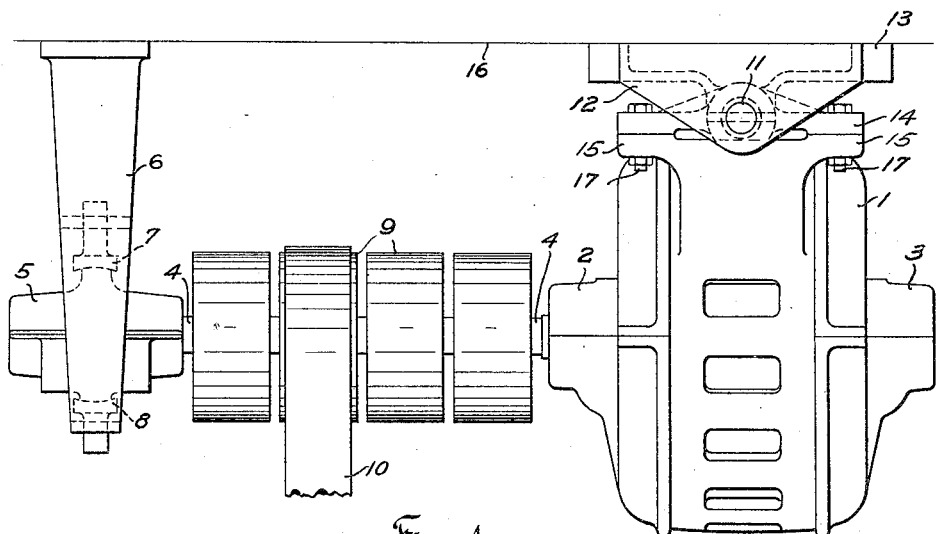
Fig. 1 shows the invention as it may be applied in connection with a ceiling-suspended electric motor.
Figure 2:
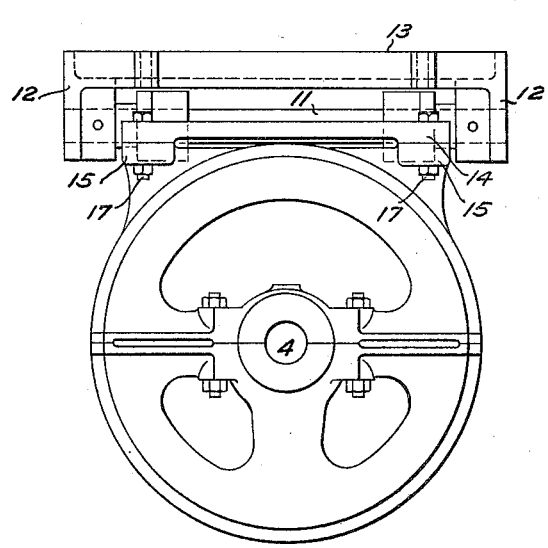
Fig. 2 is an end elevation of the construction shown in Fig. 1.

Referring to Fig. 1 the motor 1 is provided with bearings 2, 3 for its rotor shaft 4. The shaft 4 is extended to any desired length to accommodate a plurality of pulleys 9, the end of the shaft extension being supported by an outboard bearing 5. The bearing 5 is here shown as supported by a hanger 6 provided with the universal joints 7, 8. In the instance shown the direction of the belt pull would be downward, only one of the belts 10 being indicated in Fig. 1.

The motor 1 is mounted on a hinge-base comprising the stationary hinge member 13 and the movable hinge member 14. The hinge pin 11 is here shown as fixed in the brackets 12 of the stationary hinge member. The feet 15 of the motor may be fastened in any suitable manner as by bolts 17 to the movable hinge member. Both the stationary hinge member 13 and the hanger 6 are here shown as hung from the ceiling 16 or other overhead member. It is, however, clear that the invention is not limited to use in connection with ceiling suspended motors.

By reason of the pull on the belts 10, shaft 4 has a tendency to bow slightly in the direction of the belt pull but by reason of the fact that the motor 1 is hinged on an axis substantially transverse to the shaft 4 the bearing 2 is permitted to follow the direction of the belt pull. It is clear that this construction results in great flexibility, and wear on the center bearing is thus minimized.

It should be understood that it is not desired to limit the invention claimed to the exact details of construction herein shown and described, for obvious modifications may occur to persons skilled in the art.

It is claimed and desired to secure by Letters Patent:

1. In combination, a motor having two bearings for its rotor shaft, a relatively fixed third bearing for an extension of said shaft, power transmitting means on said extension tending to bend said shaft transversely, and means for swingably mounting said motor on an axis transverse to said shaft.

2. In combination, a shaft, a pivoted bearing on one side of said shaft, two other bearings for said shaft said latter bearings being relatively immovable, means for swingably mounting said latter two bearings about an axis substantially transverse to said shaft, and power transmitting means between said first named bearing and the other two tending to bend said shaft transversely.

3. In combination, a motor having two bearings for its substantially horizontal rotor shaft, a relatively fixed third bearing for an extension of said shaft, means whereby said motor may be suspended from a ceiling including means for swingably mounting said motor for motion in a substantially vertical plane, means for pivotally mounting said third bearing for motion in a substantially vertical plane, and power transmitting means on said shaft between said third bearing and the nearest motor bearing.

4. In combination, a shaft, three bearings therefor, a transverse hinge support for two of said bearings the third bearing being relatively fixed and power transmitting means between the third bearing and the center bearing tending to bend said shaft transversely.

5. In combination, a shaft, three bearings therefor, power transmitting means between the center bearing and one of the outer bearings tending to bend said shaft transversely, and means for so mounting said center bearing and the other outer bearing that said bending of said shaft causes said center bearing and outer bearing to move bodily, the first named outer bearing remaining relatively fixed.

6. In combination, a shaft, three bearings therefor, power transmitting means between the center bearing and one of the outer bearings exerting a pull on said shaft transversely thereto and means automatically operative whereby said center bearing moves bodily in the direction of said pull.

7. In combination, a shaft, three bearings therefor, power transmitting means between the center bearing and one of said outer bearings adapted to exert a pull on said shaft transversely thereto and means whereby said bearings may aline themselves along the resultant single curve of said shaft.

8. In combination, a shaft, a plurality of bearings therefor more than two, power transmitting means between two of said bearings adapted to exert a pull on said shaft transversely thereto, and means whereby said bearings may aline themselves along the resultant single curve of said shaft.

9. In combination, a shaft, a bearing associated with one end of said shaft, a motor constituting a self-contained source of power having a bearing associated with the other end of said shaft, power transmitting means between said bearings adapted to exert a pull on said shaft transversely thereto, and means whereby said bearings may aline themselves along the resultant single curve of said shaft.

10. In combination, a shaft, a bearing associated with one end of said shaft, a motor constituting a self-contained source of power having a bearing associated with the other end of said shaft, power transmitting means between said bearings tending to bend said shaft transversely, and means whereby said motor bearing may automatically aline itself with the shaft.

11. In combination, a motor having two bearings for its rotor shaft, a relatively fixed third bearing for an extension of said shaft, power transmitting means on said extension tending to bend said shaft transversely, and means including a hinge-support for said motor for preventing excessive wear of the motor-bearing between said third bearing and the other motor-bearing, the axis of said hinge extending transversely of said shaft.

12. In combination, a shaft, a bearing associated with one end of said shaft, a motor constituting a self-contained source of power having a bearing associated with the other end of said shaft, power transmitting means between said bearings adapted to exert a pull on said shaft transversely thereto, and means including a hinge-support for said motor whereby said bearings may aline themselves along the resultant curve of said shaft, the axis of said hinge extending transversely of said shaft.

13. In combination, a shaft, a bearing associated with one end of said shaft, a motor constituting a self-contained source of power having a bearing associated with the other end of said shaft, power transmitting means between said bearings adapted to exert a pull on said shaft transversely thereto, and means including a hinge-support for said motor whereby said motor bearing may aline itself with the shaft, the axis of said hinge extending transversely of said shaft.

14. In combination, a shaft, a bearing associated with one end of said shaft, a motor constituting a self-contained source of power having a bearing associated with the other end of said shaft, power transmitting means between said bearings tending to bend said shaft transversely, and means including a hinge-support for said motor whereby said motor bearing may automatically aline itself with the shaft, the axis of said hinge extending transversely of said shaft.

15. In combination, a motor having two bearings for its rotor shaft, a third bearing for an extension of said shaft, means whereby said motor may be supported including pivotal means whereby said motor may move about an axis transverse to said shaft, and power transmitting means on said shaft between said third bearing and the nearest motor bearing tending to bend said shaft transversely.

16. In combination, a shaft, a bearing associated with one end of said shaft, a motor having a bearing associated with the other end of said shaft, power transmitting means between said bearings adapted to exert a pull transversely to said shaft, a base provided with an auxiliary base swingable about an axis transverse to said shaft, and means for holding said motor on said auxiliary base.

17. In combination, a shaft, a bearing mounted for universal movement associated with one end of said shaft, a motor having a bearing associated with the other end of said shaft, power transmitting means between said bearings adapted to exert a pull transversely to said shaft, a base provided with an auxiliary base swingable about an axis transverse to said shaft, and means for holding said motor on said auxiliary base.

In testimony whereof, the signature of the inventor is affixed hereto.

CHARLES W. STEEN.